INVENTOR.
HERBERT M. PIKER
BY
Joseph A. Pave
Attorney

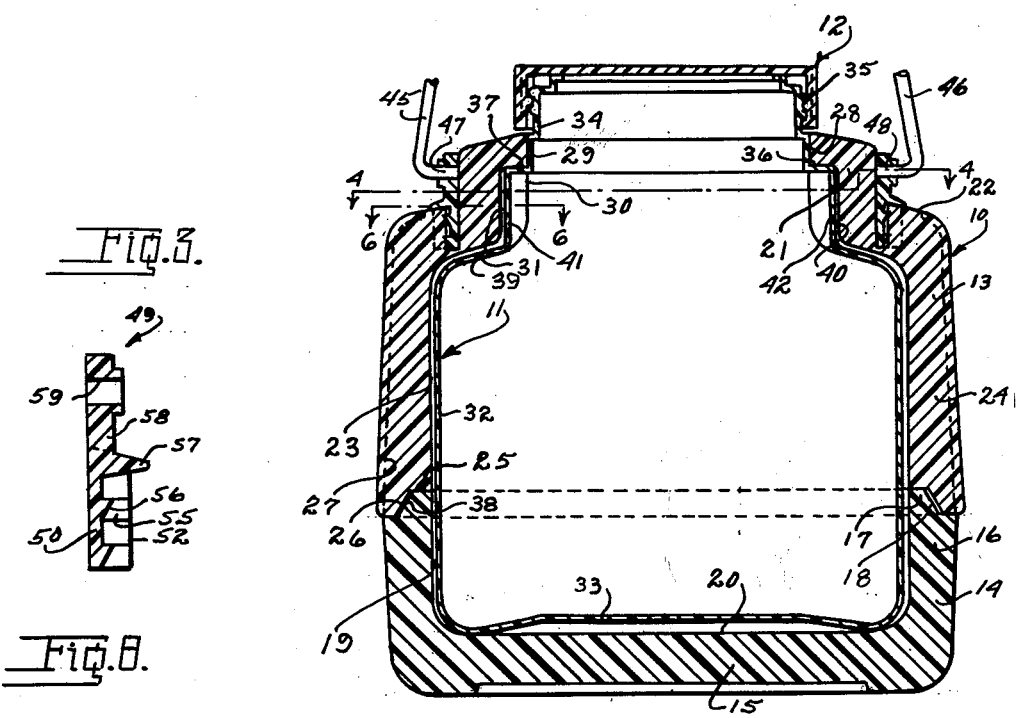
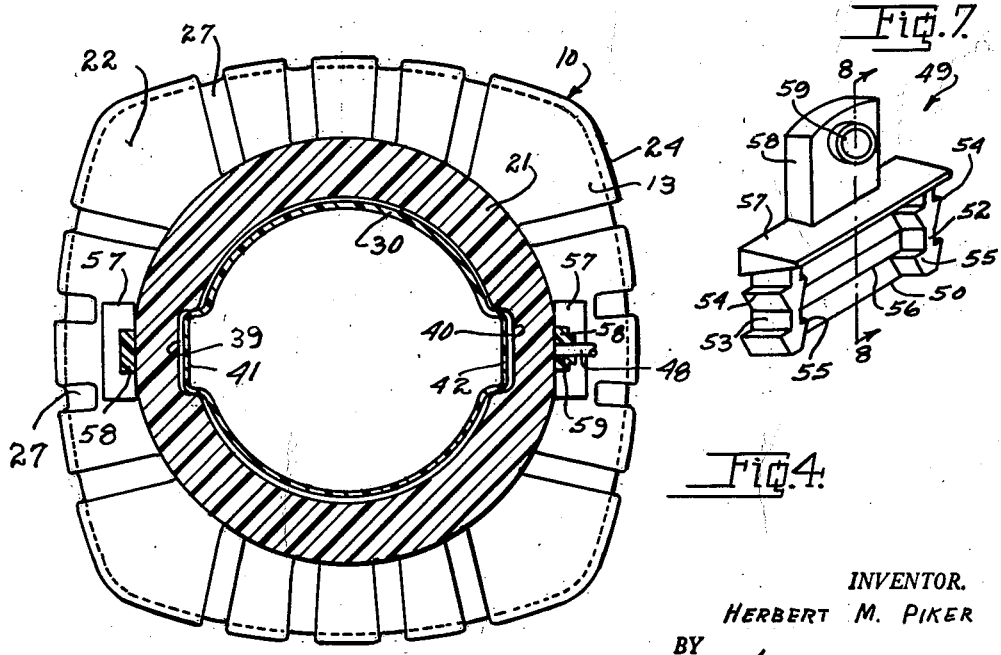

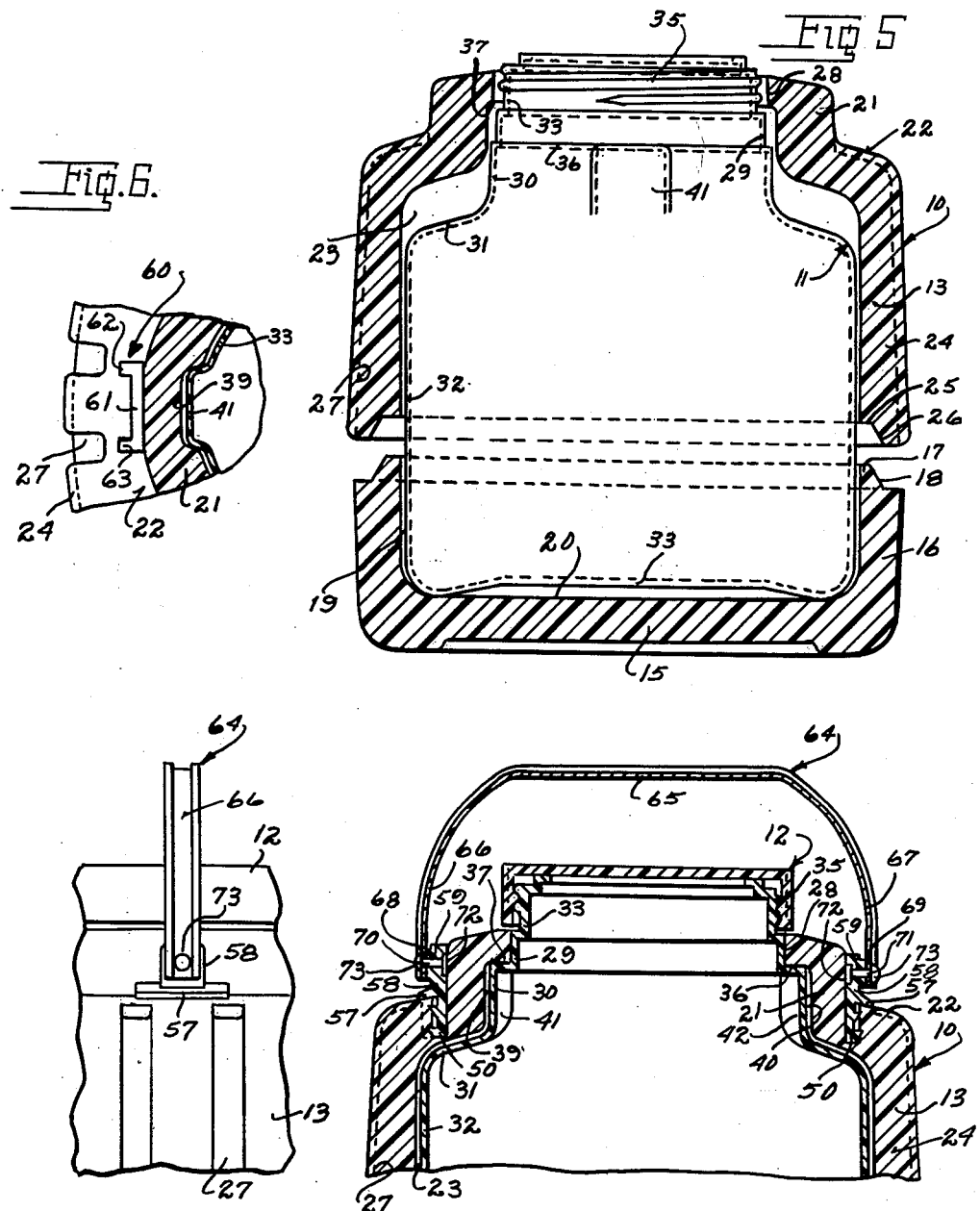

United States Patent Office 3,132,759
Patented May 12, 1964

3,132,759
INSULATED CONTAINERS
Herbert M. Piker, Wyoming, Ohio, assignor to The Hamilton-Skotch Corporation, Hamilton, Ohio, a corporation of Ohio
Filed Oct. 19, 1961, Ser. No. 146,156
12 Claims. (Cl. 215—13)

This invention relates to improvements in insulated containers, that, is, containers in the form of jugs, bottles, and the like, that are employed to maintain their contents either in a "cold" state or "hot" state as when used in transporting liquids and solids to relatively distant places, as on a picnic.

The provision and use of such a container is not new, per se, in this application, but as herein disclosed a novel container is provided.

Basically, the present invention is concerned with the particular construction of the insulated container whereby it may be economically produced and subsequently economically acquired.

Therefore, it is the principal object of the present invention to provide an insulated container or the like of a new, novel and useful construction.

Another object of the present invention is the provision of an insulated container in which use is made of an outer container or member that is formed of material that in and of itself provides insulation against transfer of heat and cold to and from the contents interiorly and which interior is formed to provide a substantially impervious surface.

Another object of this invention is the provision of a container which accomplishes the foregoing object and in which said interior surface is provided by an inner member, or container per se.

A still further object of the present invention is the provision of a container for accomplishing the foregoing objects in which the outer member is formed of plural parts, assemblable with one another for completely enclosing the inner member and providing a structure that is normally not separable.

A still further and specific object of the present invention is the provision of a container for accomplishing the foregoing objects that is formed substantially entirely of moldable material, such as, what are popularly known as, plastic material.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 3 is a vertical, sectional view of the container as seen from line 3—3 on FIG. 2.

FIG. 4 is a horizontal, sectional view through the container as seen from line 4—4 on FIG. 3.

FIG. 5 is a view partly in section and partly in elevation illustrating the principal parts of the insulated container in positions of assembly; the cross-sectioned portions of the outer member being taken at right angles to the cross-section thereof as illustrated in FIG. 3.

FIG. 6 is a fragmentary, sectional view of a portion of the assembled container with the hinge part of the carrying means for the container eliminated as would be seen from line 6—6 on FIG. 3, said construction as illustrated in FIG. 6 forming a detail of the invention.

FIG. 7 is a perspective view of the hinge part of the container carrying means utilized with the container in order to attach a carrying handle thereto.

FIG. 8 is a vertical, sectional view centrally of the hinge part illustrated in FIG. 7 and as seen from line 8—8 on said FIG. 7.

FIG. 9 is a fragmentary, vertical, sectional view of a portion of the assembled container showing a modification in the carrying handle and attachment thereof.

FIG. 10 is a fragmentary, elevational view of a portion of the assembled container showing the modified carrying handle thereon.

Throughout the several views of the drawings similar reference characters are employed to denote the same or similar parts.

The insulated container of the present invention comprises an outer member 10 and an inner member 11 with said inner member 11 having its open upper end closed by a closure cap 12.

Figure 2:
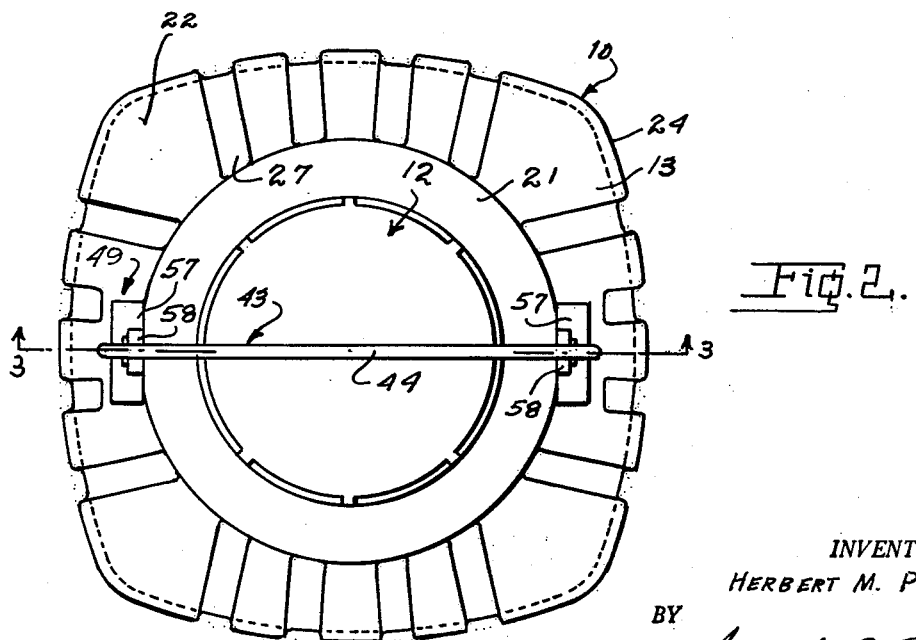
FIG. 2 is a top plan view of the container as seen in FIG. 1.

The outer member 10 is illustrated in FIGS. 2 and 4 as substantially square or rectangular in plan and with its sides outwardly arced. The particular formation is for artistic effect since the same may be made round or circular. As shown in FIGS. 3 and 5 the outer member 10 is formed of two parts, an upper portion 13 and a lower portion 14. Said lower portion 14 includes a bottom 15 from which rises sides 16. The upper ends of the sides 16 are inwardly cut to provide, in effect, an upstanding peripheral tongue 17. The tongue 17 has its outer surface downwardly inclined as at 18. Centrally of the walls 16 the said outer member lower portion 14 is provided with a circular depression 19 terminating in a base surface 20 on which, as will presently be made clear, the bottom of the inner member or container 11 rests.

The outer member upper portion 13 has at its upper end a substantially circular boss 21 at the base of which the said outer member top 22 outwardly extends, with said top also slightly downwardly inclining. The said outer member upper portion 10 is provided centrally thereof with a hollow circular interior 23 which follows the exterior contour thereof and the outer member top has downwardly projecting from its periphery the walls 24 with said walls at their lower end counter-bored, as at 25, with said counter-bore adapted to receive the tongue 17 of the outer member lower portion 14. The wall of the counter-bore 25 is inclined as at 26 to the same angle as the outer face of the lug 17, and whereby said counter-bore and lug are complementary to one another and accurately seat the upper and lower portions of the outer member with one another. The outer member upper portion walls 24 are provided with vertical grooves 27 giving the impression of ribs for an artistic effect.

The outer member upper portion circular boss 21 is provided substantially centrally thereof with a circular opening or aperture 28 through which projects a reduced sleevelike portion 29 of the inner member or container 11. The inner container 11 below its sleeve 29 is provided with a slightly enlarged sleeve portion 30 from which outwardly and slightly downwardly extends the inner container top 31 and with said top circular in plan and having integral with its periphery the wall 32 of said inner container 11. The inner container wall 32 at its lower end is integral with the periphery of the said inner container bottom 33.

Upwardly of the sleeve 29 the inner container includes a neck 34 having on its exterior surface a screw thread 35.

In practice the inner container 11 is placed within the outer member 10 by inserting the said inner container sleeve 29 through the outer member opening or aperture 28. In order to effect a proper connection between the parts, in fact, to seal the said aperture or opening 28, and since the parts are somewhat compressible, as will presently be made clear, the outer member aperture or opening 28 is formed with a slight taper outwardly and downwardly of its upper end and with the larger end of the taper substantially to the diameter of the inner container sleeve 29 and the smaller end of the taper smaller than the diameter of the said sleeve 29, it will follow that the parts will compress one another upon being assembled to their final operative position, as will presently be made clear.

In practice the outer member upper and lower portions 13 and 14 are formed of plastic foam, for example, polystyrene foam, with their walls of a thickness one-half inch, or more, depending somewhat on the user and somewhat on the specific material used, considered necessary or desirable for "heat" and "cold" insulation, while the inner container or member 11 is formed of a thermoplastic material, such as, linear polyethylene and of a thickness quite thin by comparison to the outer member. The said parts are fully and completely molded as illustrated in the drawings with the interiors of the outer member upper and lower portions being circular in plan and to a dimension slightly greater than the outer diameter of the circular container or inner member, wherefore, a slight clearance is provided between these parts to permit assembly thereof, except, as noted above, with regard to the outer member opening 28 and inner container sleeve 29. The inner member or container is assembled with the outer member upper portion by forcing said inner member sleeve 29 through the outer member opening 28, as above set forth, until a shoulder 36 at the upper end of the inner container sleeve portion 30 engages a shoulder 37 at the bottom and radially of the central opening 28. These parts being shown in relative positions at the commencement of the operation of assembling the inner container 11 and outer member upper portion 13 in FIG. 5 and with said parts being illustrated in their final positions in FIG. 3. Upon the assembly of the outer member 13 and inner container 11 the outer member lower portion 14 is assembled by inserting its tongue 17 into the counter-bore 25 of the upper portion 13 and with securing adhesive or cement 38, see FIG. 3, between the inclined or tapered faces of these parts.

After assembly of the outer member and inner container the neck 34 projects above the outer member 10 to have threadedly, removably, secured thereto the closure cap 12 as is customary with "picnic jugs" and the like.

In order to insure no relative rotation of the inner container and outer member the said outer container is provided at two diametrically opposite points, and, preferably into the circular boss 21 from the interior thereof, with angular seats or depressions 39 and 40. The inner container is provided at matching diametrically opposite points with projections 41 and 42, said projections preferably being formed outwardly of the inner container sleeve 30, all as clearly illustrated in FIGS. 3 and 4.

In order that the insulated container may be readily transported the same is provided with a bail handle 43 including a body portion 44 from the ends of which depend arms 45 and 46 respectively having their lower ends inwardly turned as at 47 and 48 to provide oscillating trunnions.

The trunnions 47 and 48 of the bail handle 43 are connected with the container through similar hinge members or parts, one of which is illustrated in detail in FIGS. 7 and 8.

The said connecting hinge member or part indicated in its entirety by the reference numeral 49 comprises a substantially U-shaped body portion, indicated in its entirety by reference numeral 50, comprising a base 51 from the opposite ends of which project arms 52 and 53. The arms 52 and 53 each has its opposite faces provided with projections 54 and 55 simulating barbs and the inner face of the base 51 is likewise provided with projections 56 also simulating barbs. The U-shaped body member 50 at its upper end includes a horizontal member 57 from the upper surface of which projects an ear 58 apertured as at 59 for receiving the bail handle trunnions.

As seen in FIG. 6 the outer member upper portion 13 has let into its top 22, just outwardly of the periphery of the circular boss 21 a U-shaped depression 60 and into which the U-shaped body portion 50 of the hinge member or part 49 is inserted.

Specifically the U-shaped depression 60 includes the transverse portion 61 receiving the base 51 of the hinge member or part 49 and with said depression 60 having arms 62 and 63 respectively receiving the outwardly projecting base portion arms 52 and 53.

In practice the depression 60 is made slightly smaller than the hinge member or part body portion 50 so that a slight pressure is required to insert the said body portion into the depression. Further, in practice, suitable securing adhesive or cement is applied to the body portion 50 which is conveniently carried by the barbs 54, 55 and 56 thereof for thereby securing the said hinge member 49 within the depression 60.

Figure 1:
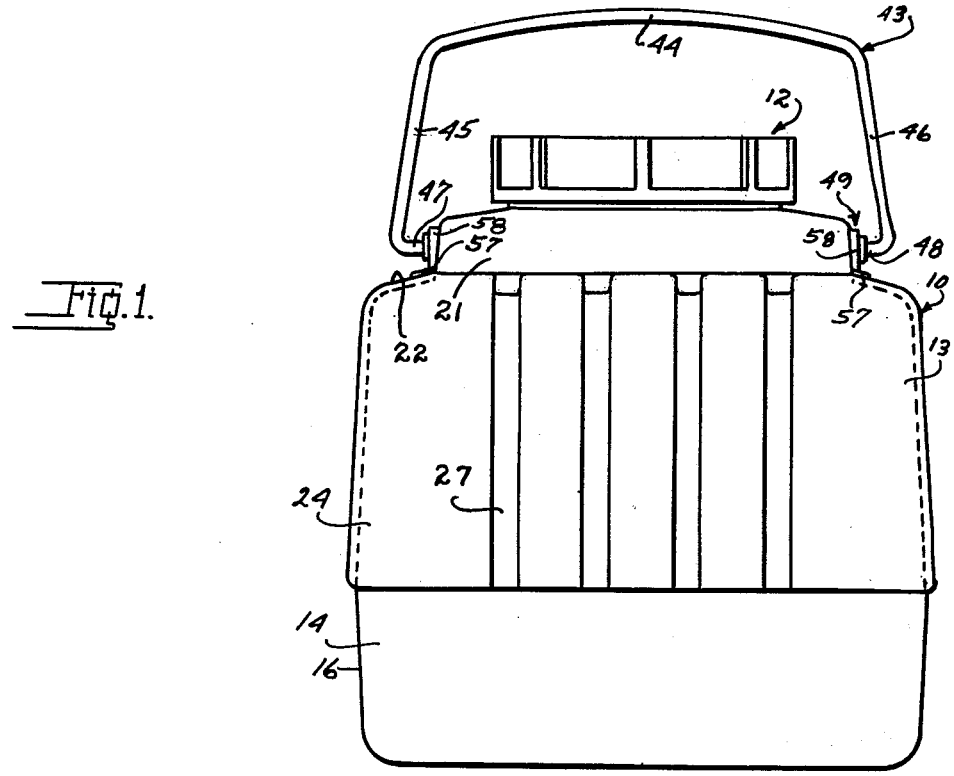
FIG. 1 is an elevational view of an insulated container embodying the principles of the present invention.

The modification illustrated in FIGS. 9 and 10 discloses the handle hinge parts 49 as having the carrying handle riveted thereto instead of snapped therein as the handle 43 is secured in FIGS. 1 and 7.

Specifically the handle 64 in said FIGS. 9 and 10 comprises a body portion 65 from the ends of which depend arms 66 and 67 with said arms being provided at their free ends with apertures 68 and 69. The said apertures 68 and 69 are, respectively, adapted to be axially aligned with the aperture 59 in its respective hinge member or part 49 and to have projected through said aligned apertures rivets 70 and 71. The rivets 70 and 71 are each provided at its inner end with a flange 72 which, if desired or necessary, may be embodied in the back, or inner, side of the hinge member ear 58 and with each of said rivets having its outer end upset to form a head 73.

In practice, the carrying handle 64 is first connected with the hinge members or parts 49 and then the said hinge members or parts connected with the container outer member as above set forth, that is, inserted and secured in its recess 60.

The handle 64 is illustrated as formed of relatively flat stock slightly channeled instead of as formed of round wire or rod as the above identified bail handle 43 is formed.

From the foregoing, it is believed now evident that there has been provided an insulated container which will accomplish the objects initially set forth.

What is claimed is:

1. In a container of the class described the combination of an outer member and an inner container circular in plan, said outer member having a circular inner surface engaged by the inner container circular outer surface and said outer member being formed with a wall thickness sufficient to insulate the contents of the inner container against transfer of heat and cold, said outer member being formed of an upper portion and a lower portion permanently secured to one another to permanently and substantially completely enclose the inner container, a filling and discharge neck upwardly extending from the inner container sealed to the outer member upper portion to project through and above the outer container upper portion, and cooperating means formed on said inner container and outer member prohibiting relative rotative movement between said inner container outer surface and said outer member inner surface.

2. In a container of the class described the combination of an outer member and an inner container circular in plan, said outer member having a circular inner surface engaged by the inner container circular outer surface and said outer member being formed with a wall thickness sufficient to insulate the contents of the inner container against transfer of heat and cold, said outer member being formed of an upper portion and a lower portion permanently secured to one another to permanently and substantially completely enclose the inner container, a filling and discharge neck upwardly extending from the inner container sealed to the outer member upper portion to project through and above the outer container upper portion, cooperating means formed on said inner container and outer member prohibiting relative rotative movement between said inner container outer surface and said outer member inner surface, and a carrying handle on said outer container.

3. In a container of the class described the combination of an outer member and an inner container, said outer member having a wall thickness sufficient to insulate the contents of the inner container against transfer of heat and cold, said outer container being formed of an upper portion and a lower portion, said lower portion having integral a bottom and a portion of the upstanding wall of the outer member, said upper portion providing the outer member remaining wall portion terminating in the outer member top having integral therewith an upstanding boss substantially centrally apertured, the inner container including a wall of a height substantially equal to the combined wall height of the outer member upper and lower portions, said inner container having a bottom on the outer member lower portion bottom and said inner container having a filling and discharge neck including a portion at the base of the neck of a larger diameter than the neck to project through the outer container upper portion boss central aperture to have the filling and discharge neck above said outer container, said neck greater diameter portion having a dimension somewhat in excess of the dimension of the boss central aperture whereby the projection of said neck greater diameter portion through the boss central aperture causes a compression of the parts and a seal is formed therebetween, and said outer member upper and lower portions having cooperating interfitting means positioning them with respect to one another and with said interfitting means permanently secured to one another for securing said outer member upper and lower portions to one another for permanently and substantially completely enclosing said inner container.

4. In a container of the class described the combination of an outer member and an inner container, said outer member having a wall thickness sufficient to insulate the contents of the inner container against transfer of heat and cold, said outer container being formed of an upper portion and a lower portion, said lower portion having integral a bottom and a portion of the upstanding wall of the outer member, said upper portion providing the outer member top and remaining wall portion with said top having an upstanding collar substantially, centrally apertured, the inner container including a wall of a height substantially equal to the combined wall height of the outer member upper and lower portions, said inner container having a bottom on the outer member lower portion bottom and said inner container having a filling and discharge neck projecting through the outer container upper portion collar central aperture to be above said outer container, and said outer member lower portion having a peripheral upstanding boss including a contacting wall surface and said upper portion having a complementary counter-sink including a contacting wall surface receiving the lower portion peripheral boss with their contacting wall surfaces permanently secured to one another for accurately positioning and securing said upper and lower portions with respect to one another for permanently and substantially completely enclosing said inner container.

5. In a container of the class described the combination of an outer member and an inner container, said outer member having a wall thickness sufficient to insulate the contents of the inner container against transfer of heat and cold, said outer container being formed of an upper portion and a lower portion, said lower portion having integral a bottom and a portion of the upstanding wall of the outer member, said upper portion providing the outer member top and remaining wall portion with said top having an upstanding collar substantially, centrally apertured, the inner container including a wall of a height substantially equal to the combined wall height of the outer member upper and lower portions, said inner container having a bottom on the outer member lower portion bottom and said inner container having a filling and discharge neck projecting through the outer container upper portion collar central aperture to be above said outer container, said outer member upper and lower portions having cooperating interfitting means positioning them with respect to one another and with said interfitting means permanently secured to one another for securing said outer member upper and lower portions to one another for permanently and substantially completely enclosing said inner container, said upper portion of the outer container downwardly of its central aperture and outwardly of its inner surface having formed therein outwardly projecting recesses, and said inner container downwardly of its filling and discharge neck having formed outwardly thereof projections disposed in the upper portion recesses.

6. In a container of the class described the combination of an outer member and an inner container, said outer member having a wall thickness sufficient to insulate the contents of the inner container against transfer of heat and cold, said outer container being formed of an upper portion and a lower portion, said lower portion having integral a bottom and a portion of the upstanding wall of the outer member, said upper portion providing the outer member top and remaining wall portion with said top having an upstanding collar substantially, centrally apertured, the inner container including a wall of a height substantially equal to the combined wall height of the outer member upper and lower portions, said inner container having a bottom on the outer member lower portion bottom and said inner container having a filling and discharge neck projecting through the outer container upper portion collar central aperture to be above said outer container, said outer member upper and lower portions having cooperating interfitting means positioning them with respect to one another and with said interfitting means permanently secured to one another for securing said outer member upper and lower portions to one another for permanently and substantially completely enclosing said inner container, said upper portion of the outer container downwardly of its central aperture and outwardly of its inner surface having formed therein outwardly projecting recesses, said inner container downwardly of its filling and discharge neck having formed outwardly thereof projections disposed in the upper portion recesses, said upper portion having sockets formed therein downwardly of its top at diametrically opposite points, a carrying handle hinge member secured in each socket and upwardly projecting from the upper portion top, and a carrying handle including trunnions inserted in said hinge members.

7. In a container of the class described the combination of an outer member and an inner container, said outer member having a wall thickness sufficient to insulate the contents of the inner container against transfer of heat and cold, said outer container being formed of an upper portion and a lower portion, said lower portion having integral a bottom and a portion of the upstanding wall of the outer member, said upper portion providing the outer member top and remaining wall portion with said top having an upstanding collar substantially, centrally apertured, the inner container including a wall of a height substantially equal to the combined wall height of the outer member upper and lower portions, said inner container having a bottom on the outer member lower portion bottom and said inner container having a filling and discharge neck projecting through the outer container upper portion collar central aperture to be above said outer container, said outer member lower portion having a peripheral upstanding boss including a contacting wall surface and said upper portion having a complementary counter-sunk including a contacting wall surface receiving the lower portion peripheral boss with their contacting wall surfaces permanently secured to one another for accurately positioning and securing said upper and lower portions with respect to one another for permanently and substantially completely enclosing said inner container, said upper portion of the outer container downwardly of its central aperture and outwardly of its inner surface having formed therein outwardly projecting recesses, said inner container downwardly of its filling and discharge neck having formed outwardly thereof projections disposed in the upper portion recesses, said upper portion having sockets formed therein downwardly of its top at diametrically opposite points, a carrying handle hinge member secured in each socket and upwardly projecting from the upper portion top, and a carrying handle including trunnions inserted in said hinge members.

8. In an insulated container of the class described the combination of an outer member formed of plastic foam and comprising an upper portion and a lower portion, said lower portion being cup-shaped and including a bottom and a portion of the wall of said outer member, said upper portion including a top from the periphery of which depends the remainder of the outer member wall and with said upper portion top having integral therewith an upstanding boss substantially centrally apertured, an inner container formed of a thermoplastic and including a bottom on the outer container lower portion bottom and a wall from the periphery of the inner container bottom, said inner container having the outer surface of its wall closely adjacent to the inner surface of the outer member wall, said inner container wall upwardly terminating in an inner container top from which upwardly projects a reduced diameter sleeve extending through the outer member upper portion centrally apertured boss with said sleeve of a dimension somewhat in excess of the dimension of the boss central aperture whereby the extension of said sleeve through said boss aperture causes a compression of the parts and forms a seal therebetween, and a filling and discharge neck above said reduced diameter sleeve to project above the outer member.

9. In an insulated container of the class described the combination of an outer member formed of plastic foam and comprising an upper portion and a lower portion, said lower portion being cup-shaped and including a bottom and a portion of the wall of said outer member, said upper portion including a top from the periphery of which depends the remainder of the outer member wall and with said upper portion of the outer member including an upstanding boss substantially centrally apertured, an inner container formed of a thermoplastic and including a bottom on the outer container lower portion bottom and a wall from the periphery of the inner container bottom, said inner container having the outer surface of its wall closely adjacent to the inner surface of the outer member wall, said inner container wall upwardly terminating in the inner container top from which upwardly projects a reduced diameter sleeve extending through the outer member upper portion central aperture with said sleeve of a dimension somewhat in excess of the dimension of the central aperture whereby a compression of the parts is effected to form a seal, a filling and discharge neck above said reduced diameter sleeve to project above the outer member, said outer member upper portion below its central aperture having recesses formed therein to project outwardly of its inner surface, and said inner container below its reduced diameter sleeve having projections formed outwardly thereof disposed in said outer member upper portion recesses.

10. In an insulated container of the class described the combination of an outer member formed of plastic foam and comprising an upper portion and a lower portion, said lower portion being cup-shaped and including a bottom and a portion of the wall of said outer member, said upper portion including a top from the periphery of which depends the remainder of the outer member wall and with said upper portion of the outer member including an upstanding boss substantially centrally apertured, an inner container formed of a thermoplastic and including a bottom on the outer container lower portion bottom and a wall from the periphery of the inner container bottom, said inner container having the outer surface of its wall closely adjacent to the inner surface of the outer member wall, said inner container wall upwardly terminating in the inner container top from which upwardly projects a reduced diameter sleeve extending through the outer member upper portion central aperture with said sleeve of a dimension somewhat in excess of the dimension of the central aperture whereby a compression of the parts is effected to form a seal, a filling and discharge neck above said reduced diameter sleeve to project above the outer member, said outer member upper portion below its central aperture having recesses formed therein to project outwardly of its inner surface, said inner container below its reduced diameter sleeve having projections formed outwardly thereof disposed in said outer member upper portion recesses, and a carrying handle oscillatably mounted on said outer member upper portion.

11. In a container of the class described the combination of an outer member and an inner container, said outer member having a wall thickness sufficient to insulate the contents of the inner container against transfer of heat and cold, said outer container being formed of an upper portion and a lower portion, said lower portion having integral a bottom and a portion of the upstanding wall of the outer member, said upper portion providing the outer member top and remaining wall portion and a central aperture from and upwardly of the outer member, the inner container including a wall of a height substantially equal to the combined wall height of the outer member upper and lower portions, said inner container having a bottom on the outer member lower portion bottom and said inner container having a filling and discharge neck projecting through the outer container upper portion central aperture to be above said outer container, said outer member upper and lower portions having cooperating interfitting means positioning them with respect to one another and with said interfitting means permanently secured to one another for securing said outer member upper and lower portions to one another for permanently and substantially completely enclosing said inner container, said upper portion having sockets formed therein downwardly of its top at diametrically opposite points, a carrying handle hinge member secured in each socket and upwardly projecting from the upper portion top, and a carrying handle including trunnions insertable in said hinge members.

12. In a container of the class described the combination of an outer member and an inner container, said outer member having a wall thickness sufficient to insulate the contents of the inner container against transfer of heat and cold, said outer container being formed of an upper portion and a lower portion, said lower portion having integral a bottom and a portion of the upstanding wall of the outer member, said upper portion providing the outer member top and remaining wall portion and a central aperture from and upwardly of the outer member, the inner container including a wall of a height substantially equal to the combined wall height of the outer member upper and lower portions, said inner container having a bottom on the outer member lower portion bottom and said inner container having a filling and discharge neck projecting through the outer container upper portion central aperture to be above said outer container, said outer member upper and lower portions having cooperating interfitting means positioning them with respect to one another and with said interfitting means permanently secured to one another for securing said outer member upper and lower portions to one another for permanently and substantially completely enclosing said inner containers, said upper portion having sockets formed therein downwardly of its top at diametrically opposite points, a carrying handle hinge member secured in each socket and upwardly projecting from the upper portion top, said hinge members each having an aperture therein, a carrying handle including a body portion and a depending arm from each end of the body portion with each depending arm terminating adjacent a hinge member, said depending arms each having at its free end an aperture in alignment with its hinge member aperture, and a rivet extending through the aligned apertures of each depending arm and hinge member for hingedly connecting the carrying handle to the container.

References Cited in the file of this patent

UNITED STATES PATENTS

| | | |
|---|---|---|
| 1,639,492 | Dunzweiler | Aug. 16, 1927 |
| 2,500,786 | Austin | Mar. 14, 1950 |
| 2,563,508 | Anschicks | Aug. 7, 1951 |
| 2,818,990 | Sommerfeld | Jan. 7, 1958 |
| 3,070,253 | Brown | Dec. 25, 1962 |

FOREIGN PATENTS

| | | |
|---|---|---|
| 1,149,650 | France | Dec. 30, 1957 |
| 1,081,632 | Germany | May 12, 1960 |